United States Patent [19]
Huercanos

[11] Patent Number: 5,250,151
[45] Date of Patent: Oct. 5, 1993

[54] METHOD OF EVAPORATING LIQUIDS

[76] Inventor: Joaquin Huercanos, Paseo de los Arbustos, 2-1, 20009 San Sebastian, Spain

[21] Appl. No.: 846,946

[22] Filed: Mar. 6, 1992

Related U.S. Application Data

[62] Division of Ser. No. 596,047, Oct. 11, 1990, Pat. No. 5,151,154.

[51] Int. Cl.$^5$ .................... B01D 1/12; B01D 1/22
[52] U.S. Cl. .................... 159/47.1; 159/13.4; 159/14; 159/16.1; 159/27.1; 159/49; 159/901; 159/DIG. 13; 203/7
[58] Field of Search .......... 159/13.2, 13.4, 14, 159/27.1, 27.2, 27.3, 27.4, 16.1, 16.3, DIG.13, 901, 49, 47.1; 203/7; 202/234, 237

[56] References Cited
U.S. PATENT DOCUMENTS

| | | | |
|---|---|---|---|
| 1,006,197 | 10/1911 | Frasch | 159/DIG. 13 |
| 1,831,121 | 11/1931 | Kermer | 159/27.2 |
| 2,257,531 | 9/1941 | Peebles | 159/27.1 |
| 2,490,759 | 12/1949 | Tyden | 159/DIG. 13 |
| 2,619,453 | 11/1952 | Andersen | 159/27.2 |
| 3,165,435 | 1/1965 | Henszey | 159/27.3 |
| 3,177,129 | 4/1965 | Huckins | 159/27.3 |
| 3,245,460 | 4/1966 | Loebel | 203/4 |
| 4,076,576 | 2/1978 | Marttala | 159/13.3 |
| 4,586,565 | 5/1986 | Hallstrom et al. | 159/28.6 |
| 4,641,706 | 2/1987 | Haynie | 261/153 |

Primary Examiner—Wilbur Bascomb, Jr.
Attorney, Agent, or Firm—Roylance, Abrams, Berdo & Goodman

[57] ABSTRACT

An evaporation assembly for concentrating liquids having an evaporation area for conveying a liquid to be concentrated and a heating system for heating and concentrating the liquid conveyed through the evaporation area. The evaporation area includes a liquid inlet for introducing liquid to be concentrated into the evaporation area, and a liquid and vapor outlet for conveying the liquid through the evaporation area. A vapor circulating system is coupled between the liquid inlet end and the liquid and vapor outlet of the evaporation area for increasing the velocity of the liquid to be concentrated for impeding or removing precipitated particles or deposits from the heat exchange surfaces.

9 Claims, 4 Drawing Sheets

METHOD OF EVAPORATING LIQUIDS

This is a division of application Ser. No. 07/596,047 filed Oct. 11, 1990, now U.S. Pat. No. 5,151,154.

FIELD OF THE INVENTION

The present invention relates to an evaporation assembly for concentrating liquids. More particularly, the present invention provides an evaporation assembly for impeding or removing solid deposits from the heat exchange surfaces. Vapors are circulating from the evaporation area into the inlet liquid for increasing the velocity of the mixture of the liquid and vapors being conveyed through the evaporation area, and thus impeding the precipitation of particles or deposits on the heat exchange surfaces.

BACKGROUND OF THE INVENTION

Two typical types of evaporation devices are the falling film type and the rising film type. In the falling film type, the liquid is forced downwardly along essentially vertical heat transfer walls with steam or vapors being generated between liquid films. On the other hand, in the rising film type, the liquid is forced upwardly along essentially vertical heat transfer walls with steam or vapors being generated between liquid films. In the falling film type as well as the rising film type of evaporation devices, the vertical heat transfer walls may be vertically extending plates or tubes with a hot medium, such as steam, circulating between the heat transfer walls.

Examples of falling film type evaporation devices utilizing tubes are disclosed in U.S. patents 4,076,576 to Marttala and 4,641,706 to Haynie, which are both incorporated herein by reference. An example of an evaporation device utilizing vertically extending heat exchange plates is disclosed in U.S. Pat. No. 4,586,565 to Hallstrom et al, which is incorporated herein by reference.

A major problem occurring in most evaporation assemblies is the collection of solid deposits on the heat exchange surfaces. In particular, when the liquid in the tubes or evaporation area begins to evaporate and the solubility coefficient is surpassed, crystals or gums start to precipitate. Accordingly, the greater the concentration of the liquid, the greater is the viscosity of the liquid as well. Accordingly, the concentrated liquid tends to move slower, and consequently either the precipitate salt crystals or the gums from the liquid will begin to adhere or stick to the walls of the heat exchange surfaces. Once the crystals or gums begin to adhere to the hot wall of the heat exchanger, additional crystals or gums will begin to adhere at an exponential rate.

These solid deposits or scalings decrease the overall efficiency of the heat exchange by reducing the overall heat exchange coefficient, i.e., the amount of heat exchange per unit of time over a given surface area Moreover, the solid deposits can, over a period of time, build up on the heat exchange surfaces to a point requiring stopping operation and cleaning the heat exchange surfaces. Accordingly, this is a very serious problem which designers or manufacturers have made many efforts to overcome.

SUMMARY OF THE INVENTION

Accordingly, an object of the present invention is to provide an evaporation assembly that circulates vapors formed from concentrating the liquid into the evaporation area at a sufficient velocity to impede the precipitated particles from adhering or sticking to the walls of the heat exchanger.

Another object of the present invention is to provide an evaporation assembly that continuously impedes solid deposits from sticking onto the walls of the heat exchanger without stopping operation of the evaporation assembly.

A further object of the present invention is to provide an evaporation assembly that has a higher heat transfer coefficient than similar evaporation assemblies with identical heat exchange surfaces.

The foregoing objects are basically attained by an evaporation assembly for concentrating liquids, comprising an evaporation area, with a liquid inlet coupled to one end of the evaporation area for conveying liquid to be concentrated into the evaporation area and a liquid and vapor outlet coupled to the other end of the evaporation area for removing and separating concentrated liquid and vapors from the evaporation area. A heating medium is positioned adjacent the evaporation area for heating the liquid conveyed through the evaporation area. Vapor circulating members are coupled to the liquid and vapor outlet and the liquid inlet for conveying vapors from the liquid and vapor outlet to said liquid inlet and for mixing vapors from the liquid and vapor outlet with liquid to increase the velocity of the mixture of the liquid and vapors conveyed through the evaporation area.

The foregoing objects are further attained by a method for concentrating liquids, comprising the steps of conveying liquid through an evaporation area from an inlet end to an outlet end; heating the liquid conveyed through the evaporation area to concentrate the liquid; circulating vapors generated by concentrating the liquid in the evaporation area from the outlet end of the evaporation area to the inlet end of the evaporation area for mixing with liquid in the inlet end to increase velocity of liquid conveyed through the evaporation area; and collecting the concentrated liquid at the outlet end.

Other objects, advantages and salient features of the invention will become apparent from the following detailed description, which, taken in conjunction with the annexed drawings discloses preferred embodiments of the invention.

BRIEF DESCRIPTION OF THE DRAWINGS

Referring to the drawings which form a part of this disclosure.

DETAILED DESCRIPTION OF THE INVENTION

Figure 1:
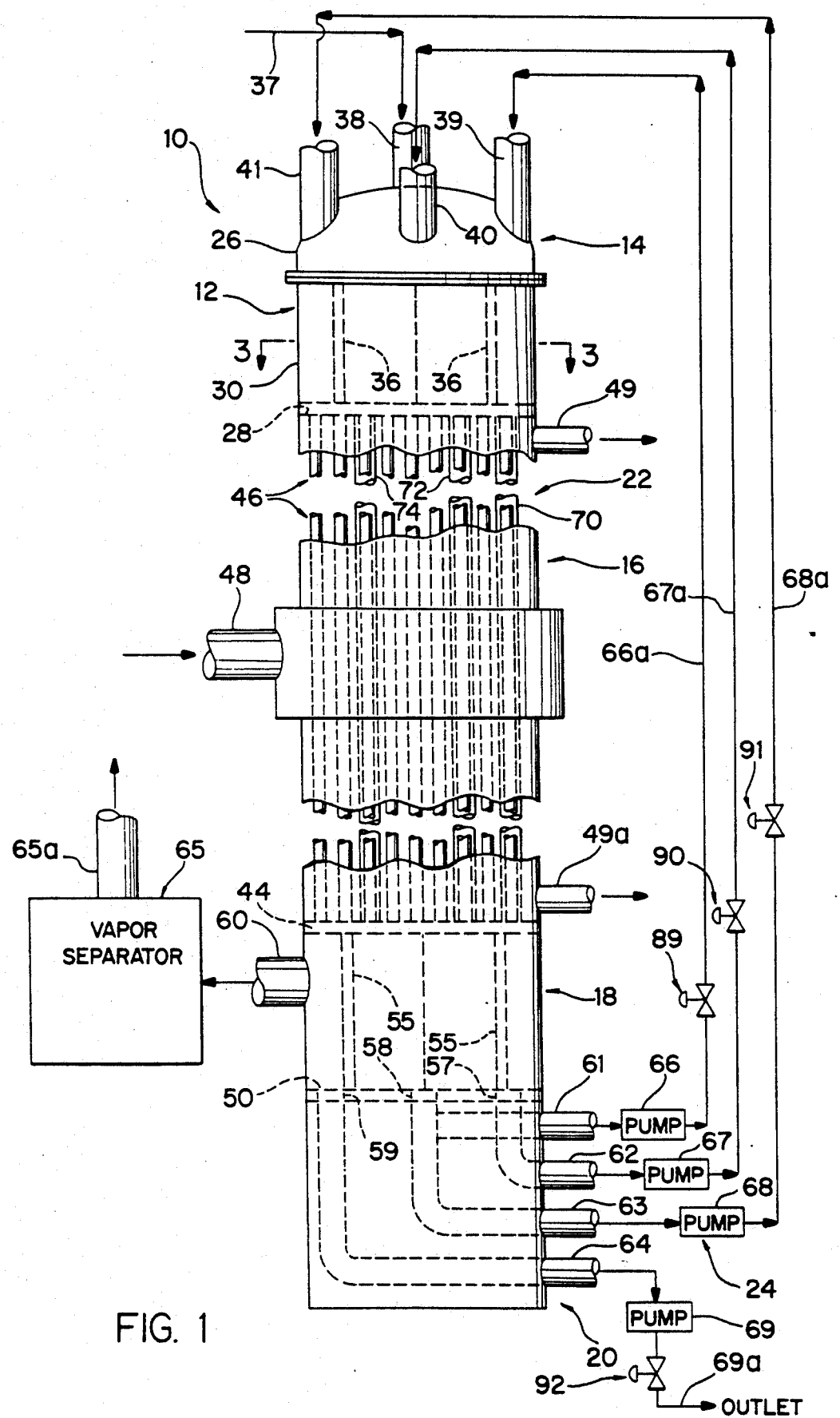
FIG. 1 is a partial side elevational view of an evaporation assembly in accordance with a first embodiment of the present invention.
Figures 2, 3:
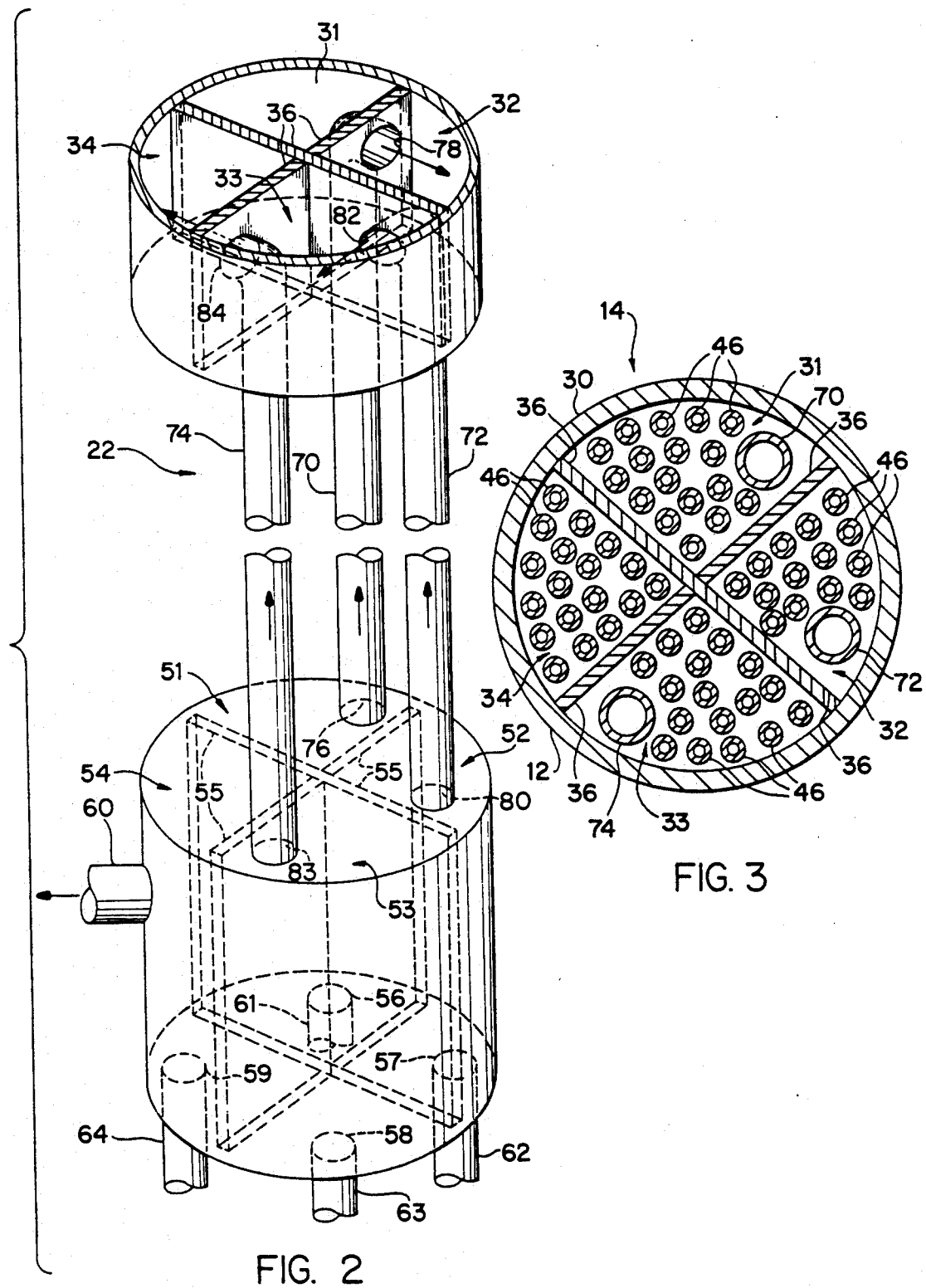
FIG. 2 is a schematic perspective view of the evaporation assembly of FIG. 1 with the heat exchange tubes removed for clarity.
FIG. 3 is a top plan view in section taken along line 3—3 of FIG. 1.

Referring initially to FIG. 1, an evaporation assembly 10 is illustrated in accordance with the present invention, and includes an outer housing 12 with an inlet or head portion 14 at its upper end for receiving inlet liquid to be concentrated, a heat exchange portion 16 below inlet portion 14 for concentrating the liquid being conveyed therethrough by evaporation, an outlet or leg portion 18 located below heat exchange portion 16 for receiving the concentrated or partially concentrated liquid along with the vapors, and a base portion 20 located below outlet portion 18 for vertically supporting outer housing 12. Evaporation assembly 10 also includes a vapor circulating system 22 rigidly coupled between inlet portion 14 and outlet portion 18 as seen in FIG. 2, and a liquid circulating system 24 rigidly coupled to outer housing 12.

Vapor circulating system 22 circulates or conveys the vapors, usually water vapors, generated by the evaporation of the liquid conveyed through heat exchange portion 16 into the inlet liquid at a sufficient velocity and pressure to increase the velocity of the mixture of these vapors and the inlet liquid for impeding the precipitated particles or deposits from adhering to the heat exchange surfaces. At higher velocities, the vapors increase the velocity of the inlet liquid to cause the inlet liquid to break up into droplets. These droplets of liquid contact the exchange surfaces with sufficient force to remove or impede precipitated particles or deposits, which adhere to the heat exchange surfaces.

Evaporation assembly 10 can be either a single effect system or used together with a plurality of evaporation assemblies 10 for a multiple effect system. Likewise, evaporation assembly may be either a falling film type, a rising film type, or any other suitable type of evaporation assembly. However, for clarity, only a single effect falling film type evaporation assembly will be discussed in detail.

Inlet or head portion 14 is defined by a cover 26, a first circular plate 28 and a portion of cylindrical wall 30 of outer housing 12 extending between cover 26 and first plate 28. As seen in FIGS. 2 and 3, inlet portion 14 is divided into four equally sized inlet sections 31, 32, 33 and 34 by baffles 36. Baffles 36 are rigidly coupled between first circular plate 28 and cover 26 for separating the inlet liquid in each of the inlet sections 31-34 from the inlet liquid in the other sections. Inlet tubes 38, 39, 40 and 41 are rigidly coupled to cover 26 for conveying inlet liquid from inlet tubes 38, 39, 40 and 41 into inlet sections 31, 32, 33 and 34, respectively.

Heat exchange portion 16 is defined by a portion of cylindrical wall 30 of outer housing 12 which extends between first circular plate 28 and second circular plate 44. A plurality of vertically extending heat exchange tubes 46 are rigidly coupled between first plate 28 and second plate 44 for providing fluid communication between inlet portion 14 and outlet portion 18. In particular, first plate 28 has a plurality of openings with each opening aligned with an upper end of one of the heat exchange tubes 46 for permitting the inlet liquid in each of the sections 31-34 to enter into heat exchange tubes 46. Second circular plate 44 has a plurality of openings with each opening being aligned with the lower end of one of the heat exchange tubes 46 for permitting the concentrated liquid and vapors to enter outlet portion 18.

The interior areas of heat exchange tubes 46 between first plate 28 and second plate 44 define an evaporation area. Accordingly, the longer the heat exchange tubes 46, the greater the evaporation area. Heat exchange tubes 46 are split into four sets of heat exchange tubes. The first set fluidly communicates with inlet section 31, the second set fluidly communicates with inlet section 32, the third set fluidly communicates with inlet section 33, and the fourth set fluidly communicates with inlet section 34.

A heat medium inlet 48 is rigidly coupled to outer cylindrical wall 30 for communicating a heat or hot medium, such as steam, into heat exchange portion 16 to heat all four sets of heat exchange tubes 46. Each of the four sets of heat exchange tubes 46 is heated with the same quality of thermal fluid or steam. Accordingly, when tubes 46 are heated by the hot medium, heat is then transferred to the liquid being conveyed through heat exchange tubes 46 for causing the liquid to be concentrated by evaporation, and thereby produce vapors. Heat exchange portion 16 also includes a non-condensible gas outlet 49 extending through cylindrical wall 30 adjacent first plate 28 for removing the non-condensible gas towards the condenser, and a condensed vapor outlet 49a extending through cylindrical wall 30 adjacent second plate 44 for removing the condensed vapors or condensates. It should be apparent that heat exchange tubes 46 can be replaced with other types of heat exchange surfaces, such as heat exchange plates.

Outlet or leg portion 18 is defined by a portion of cylindrical wall 30 of outer housing 12 which extends between second circular plate 44 and a third circular plate 50. Four outlet sections 51, 52, 53, and 54 are formed by baffles 55 in outlet portion 18 for receiving the concentrated or partially concentrated liquid and vapors from heat exchange tubes 46. Each of the four sections 51-54 has a liquid outlet opening 56, 57, 58 and 59, respectively, for removing the concentrated or partially concentrated liquid therefrom. Sections 51-53 are fluidly coupled to circulating system 22 by circulating tubes 70, 72 and 74, respectively, for removing vapors therefrom as discussed below. Vapors from section 54, on the other hand, are discharged through a vapor outlet 60 to a vapor separator 65 and then to the next effect, or to the condenser via tube 65a.

Accordingly, the following effects can utilize the vapors, usually water vapors, generated by the preceding effect as the heat medium for concentrating the liquid in the next effect. In other words, in a multiple effect the second effect has its heat medium inlet 48 coupled to tube 65a of the first effect for utilizing the vapors generated by evaporation in the first effect for concentrating the liquid therein; the third effect has its heat medium inlet 48 coupled to tube 65a of the second effect for utilizing the vapors generated by evaporation in the second effect for concentrating the liquid therein; and so on.

Liquid circulating system 24 has four discharge tubes 61, 62, 63, and 64 rigidly coupled to outlet openings 56-59, respectively, in third plate 50 for removing the concentrated liquid from sections 51-54, respectively, and for conveying the concentrated fluid to the next section or to a collecting tank or the next effect by fluid pumps 66, 67, 68 and 69. In particular, fluid pump 66 conveys the liquid from outlet section 51 through tube 66a and inlet tube 39 to inlet section 32. Fluid pump 67 conveys the liquid from outlet section 52 through tube 67a and inlet tube 40 to inlet section 33. Fluid pump 68 conveys the liquid from outlet section 53 through tube 68a and inlet tube 41 to inlet section 34. Fluid pump 69 conveys the liquid from outlet section 54 through tube 69a to a collecting tank or the next effect.

As seen in FIGS. 2 and 3, vapor circulating system 22 includes three circulating tubes 70, 72 and 74 for circulating or conveying the vapors from the outlet section of one set of heat exchange tubes 46 to the inlet section of another set of heat exchange tubes 46. While circulating tubes 70, 72 and 74 are illustrated as being located within housing 12, it will be apparent that the circulating tubes can be located externally of housing 12.

First circulating tube 70 extends from first outlet section 51 of outlet portion 18 to second inlet section 32 of inlet portion 14 for conveying the vapors from first outlet section 51 to second inlet section 32. The vapors are conveyed at a sufficient velocity and pressure to impede the precipitated particles or deposits from adhering to the heat exchange surfaces of heat exchange tubes 46. At higher velocities, the circulated vapors break the liquid up into liquid droplets which act as a hammer or scraper against the heat exchange surfaces of heat exchange tubes 46 for continuously removing precipitated particles deposited thereon. In particular, first circulating tube 70 has its bottom end rigidly coupled to opening 76 in third plate 50, and its upper end rigidly coupled to opening 78 in baffle 36 for fluidly communicating vapors from outlet section 51 to inlet section 32.

Second circulating tube 72 fluidly communicates second outlet section 52 with third inlet section 33 for conveying vapors therethrough. In particular, second circulating tube 72 has its bottom end rigidly coupled to opening 80 in third plate 50, and its upper end rigidly coupled to opening 82 in baffle 36 for fluidly communicating vapors from outlet section 52 to inlet section 33.

Third circulating tube 74 fluidly communicates third outlet section 53 with fourth inlet section 34 for conveying vapors therethrough. In particular, third circulating tube 74 has its bottom end rigidly coupled to opening 83 in third plate 50, and its upper end rigidly coupled to opening 84 in baffle 36 for fluidly communicating vapors from outlet section 53 to inlet section 34.

While evaporation assembly 10 has been illustrated with four heat exchange sections, it will be apparent that the evaporation assembly can have fewer or more heat exchange sections, in any of a variety of arrangements or alignments. Moreover, while evaporation assembly 10 has been illustrated with heat exchange sections of equal size and number of tubes of the same diameter, it will be apparent that the evaporation assembly can be constructed with each of the heat exchange sections varying in size, number of tubes, materials of the heat exchange surfaces, the shape of the heat exchange surfaces and other aspects.

Operation

Referring to FIGS. 1 and 2, initially, liquid from tube 37 enters evaporation assembly 10 through inlet tube 38 into inlet section 31 of inlet portion 14. The liquid then enters a first set of heat exchange tubes 46 communicating with inlet section 31 and begins to evaporate, thereby generating water vapors and becoming more concentrated. In particular, the liquid is evaporated and concentrated by the heat medium circulating in heat exchange portion 16, which heats heat exchange tubes 46 and then the liquid being conveyed through heat exchange tubes 46. Next, the liquid exits the first set of heat exchange tubes 46 into outlet section 51, where the vapors and partially concentrated liquid are separated.

The vapors from outlet section 51 are forced or thrusted upwardly through first circulating tube 70 and into inlet section 32 due to the differential of absolute pressure existing between inlet section 31 and inlet section 32. The partially concentrated liquid from outlet section 51 is also conveyed into inlet section 32 via discharge tube 61, pump 66 and inlet tube 39. The flow of partially concentrated liquid from outlet section 51 to inlet section 32 is automatically controlled by a level control valve 89, which maintains a constant level of liquid inside the outlet section 51. The circulated vapors mix with the partially concentrated liquid in inlet section 32, and then are conveyed through the second set of heat exchange tubes 46 at a sufficient velocity and pressure to increase the velocity of the partially concentrated liquid for impeding precipitated particles or deposits from adhering or sticking to the heat exchange surfaces. In particular, the mixture of partially concentrated liquid and vapors are conveyed through the second set of heat exchange tubes 46 communicating with inlet section 32 and outlet section 52 to further concentrate the liquid by evaporation, and thus generate additional vapors. Also at higher velocities, the circulated vapors break the liquid up into liquid droplets which act as scrapers to remove any deposits adhering to the heat exchange surfaces of heat exchange tubes 46. The partially concentrated liquid and the vapors generated from the first and second sets of heat exchange tubes 46 exit into outlet section 52, where the vapors and partially concentrated liquid are separated.

The vapors from outlet section 52 are forced or thrusted upwardly through second circulating tube 72 into inlet section 33 due to the differential of absolute pressure existing between inlet section 32 and inlet section 33. The partially concentrated liquid from outlet section 52 is also conveyed into inlet section 33 via discharge tube 62, pump 67 and inlet tube 40. The flow of partially concentrated liquid from outlet section 52 to inlet section 33 is automatically controlled by a level control valve 90, which maintains a constant level of liquid inside the outlet section 52. The circulated vapors mix with the partially concentrated liquid in inlet section 33, and then are conveyed through the third set of heat exchange tubes 46 at a sufficient velocity and pressure to increase the velocity of the partially concentrated liquid for impeding precipitated particles or deposits from adhering or sticking to the heat exchange surfaces. In particular, the mixture of the partially concentrated liquid and the vapors are conveyed through the third set of heat exchange tubes 46 communicating with inlet section 33 and outlet section 53 to further concentrate the liquid by evaporation, and thus generate additional vapors. The third set of heat exchange tubes 46 are maintained substantially free from deposits due to the increased velocity of the liquid by the circulated vapors as discussed above. The partially concentrated liquid and the vapors generated from the first, second and third sets of heat exchange tubes 46 exit into outlet section 53, where the vapors and partially concentrated liquid are separated.

Next, the vapors from outlet section 53 are forced or thrusted upwardly through third circulating tube 74 into inlet section 34 due to the differential of absolute pressure existing between inlet section 33 and inlet section 34. The partially. concentrated liquid from outlet section 53 is also conveyed into inlet section 34 via discharge tube 63, pump 68 and inlet tube 41. The flow of partially concentrated liquid from outlet section 53 to inlet section 34 is automatically controlled by a level control valve 91, which maintains a constant level of liquid inside outlet section 53. The circulated vapors mix with the partially concentrated liquid in inlet section 34, and then are conveyed through the fourth set of heat exchange tubes 46 at sufficient velocity and pressure to increase the velocity of the partially concentrated liquid for impeding precipitated particles or deposits from adhering or sticking to the heat exchange surfaces. In particular, the mixture of partially concentrated liquid and vapors are conveyed through the fourth set of heat exchange tubes 46 communicating with inlet section 34 and outlet section 54 to further concentrate the liquid by evaporation, and thus generate additional vapors. The fourth set of heat exchange tubes 46 are maintained substantially free from deposits due to the increased velocity of the liquid by the circulated vapors as discussed above. The concentrated liquid and the vapors generated from the first, second, third and fourth sets of heat exchange tubes 46 exit into outlet section 54, where the vapors and concentrated liquid are separated.

The total vapors generated by the four sections of heat exchange tubes 46 now exit evaporation assembly 10 through vapor outlet 60 to vapor separator 65, and then to the next effect or to the condenser. The vapors from vapor separator 65 are forced or thrusted to the next effect or to the condenser due to the differential of absolute pressure existing between vapor separator 65 and the next effect or condenser. The concentrated liquid is then conveyed to the next effect or operation via discharge tube 64 and pump 69. The flow of concentrated liquid from outlet section 54 is automatically controlled by a level control valve 92, which maintains a constant level of liquid inside outlet section 54.

Figure 4:
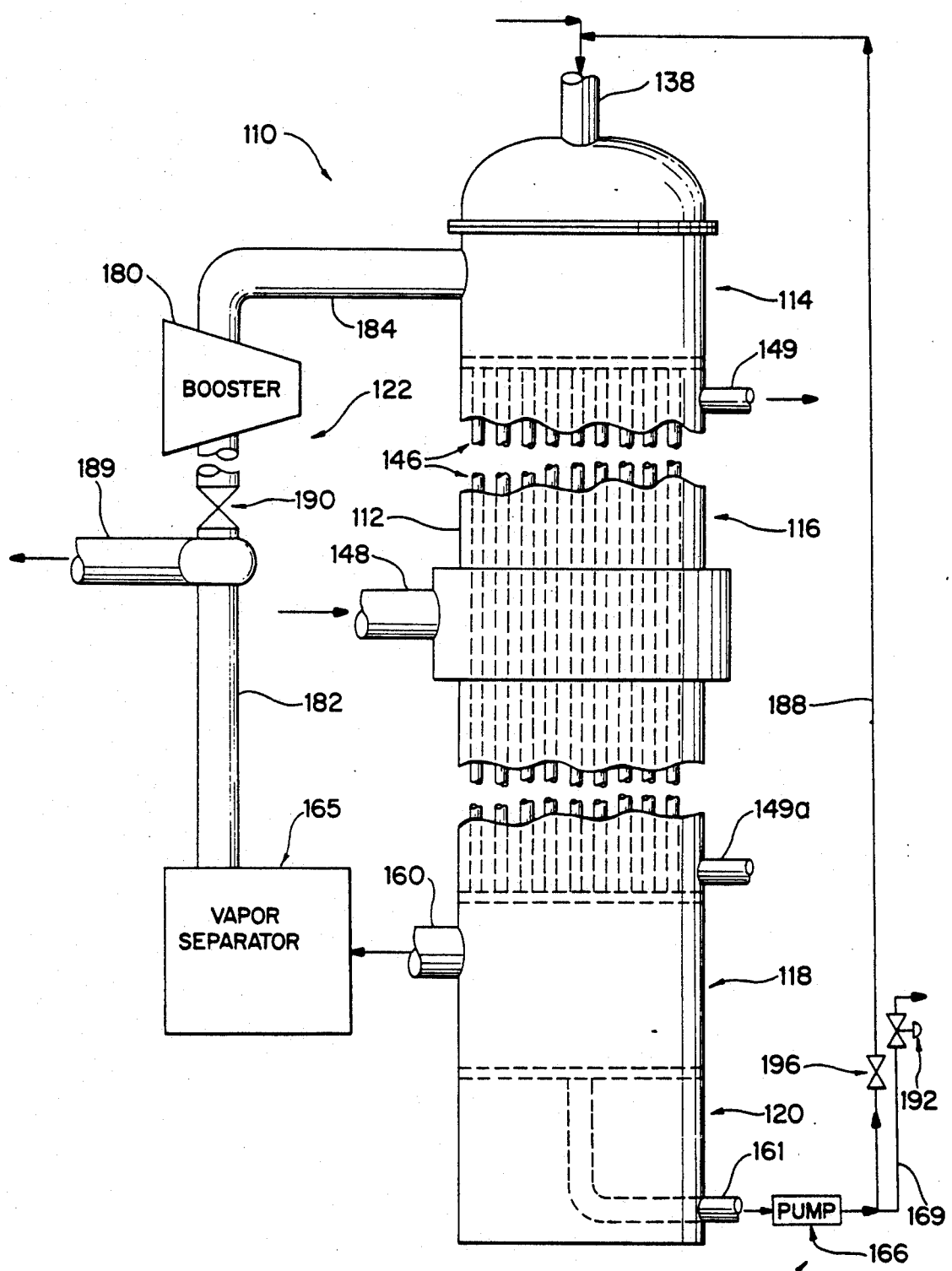
FIG. 4 is a partial side elevational view of an evaporation assembly in accordance with a second embodiment of the present invention.

Second Embodiment of FIG. 4

As seen in FIG. 4, a second embodiment of an evaporation assembly 110 is illustrated in accordance with the present invention. Evaporation assembly 110 is substantially identical to evaporation assembly 10, except that vapor circulating system 22 has been replaced with vapor circulating system 122, liquid circulating system 24 has been replaced with liquid circulating system 124, liquid inlet tubes 38-41 have been replaced with a single inlet tube 138, and baffles 36 and 56 have been removed. Accordingly, evaporation assembly 110 will not be discussed in detail.

Evaporation assembly 110 includes an outer housing 112 with an inlet portion 114 at its upper end for receiving inlet liquid to be concentrated and recycled vapors, a heat exchange portion 116 below inlet portion 114 for concentrating the liquid being conveyed through heat exchange tubes 146 by evaporation, an outlet portion 118 for receiving the concentrated or partially concentrated liquid along with the vapors, and a base portion 120 located below outlet portion 118. Evaporation assembly 110 also includes a vapor circulating system 122 and a liquid circulating system 124.

Vapor circulating system 122 utilizes a compressor or booster 180 for circulating the vapors generated by the heat exchange portion 116 at a desired velocity. Booster 180 is coupled in fluid communication between inlet portion 114 and outlet portion 118 via outlet tube 160, a vapor separator 154 and circulating tubes 182 and 184. Circulating system 122 recirculates the vapor generated by heat exchange portion 116 back into inlet portion 114 for increasing the velocity of the liquid being conveyed through heat exchange tubes 146 to a velocity sufficient to impede particles or deposits from adhering to the heat exchange surfaces of heat exchange tubes 146.

Circulating tube 182 can be provided with an automatic or manual valve 190 for controlling the flow rate of vapors into booster 180. Valves, such as valve 190, are conventional, and thus, valve 190 will not be discussed herein.

Liquid circulating system 124 includes a pump 166 coupled to outlet tube 161 and a circulating tube 188 coupled between pump 166 and inlet tube 138 for recycling partially concentrated liquid back through heat exchange portion 116. Liquid circulating system 124 could be eliminated, since evaporation assembly 110 can be operated without recycling the partially concentrated liquid.

In operation of evaporation assembly 110, the liquid to be evaporated or concentrated first enters inlet portion 114, either alone or mixed with recycled, partially or totally concentrated liquid, through inlet tube 138. The liquid then enters heat exchange portion 116 via heat exchange tubes 146. While in heat exchange portion 116, the liquid is concentrated by the heat transferred by the thermal fluid entering housing 112 through heat medium inlet 148, and thereby heating tubes 146. The non-condensible gas of the thermal fluid is removed from heat exchange portion 116 through the outlet pipe 149 towards the vacuum station or to the atmosphere. The condensed vapors or condensates of the thermal fluid are removed from heat exchange portion 116 through outlet pipe 149a. Next, the fully or partially concentrated liquid exits tubes 146 and enters outlet portion 118, where the vapors are separated from the liquid. The liquid is then regulated either manually or automatically to the desired flow rate by valve 196 and then conveyed back to inlet 138 via liquid circulating system 124 and liquid recirculating tube 188. The remaining portion of the liquid is conveyed via liquid recirculating system 124 to the next effect or to the next operation via outlet tube 169. A level control valve 192 in outlet tube 169 maintains a constant level of liquid inside the outlet section 118. The vapors, on the other hand, are conveyed to vapor separator 165 via tube 160. The vapors are then regulated either manually or automatically to the desired flow rate by valve 190 and then recirculated back into inlet portion 114 via vapor recirculating system 122. The remaining vapors are conveyed to the next effect or to a condenser via pipe 189.

Figure 5:
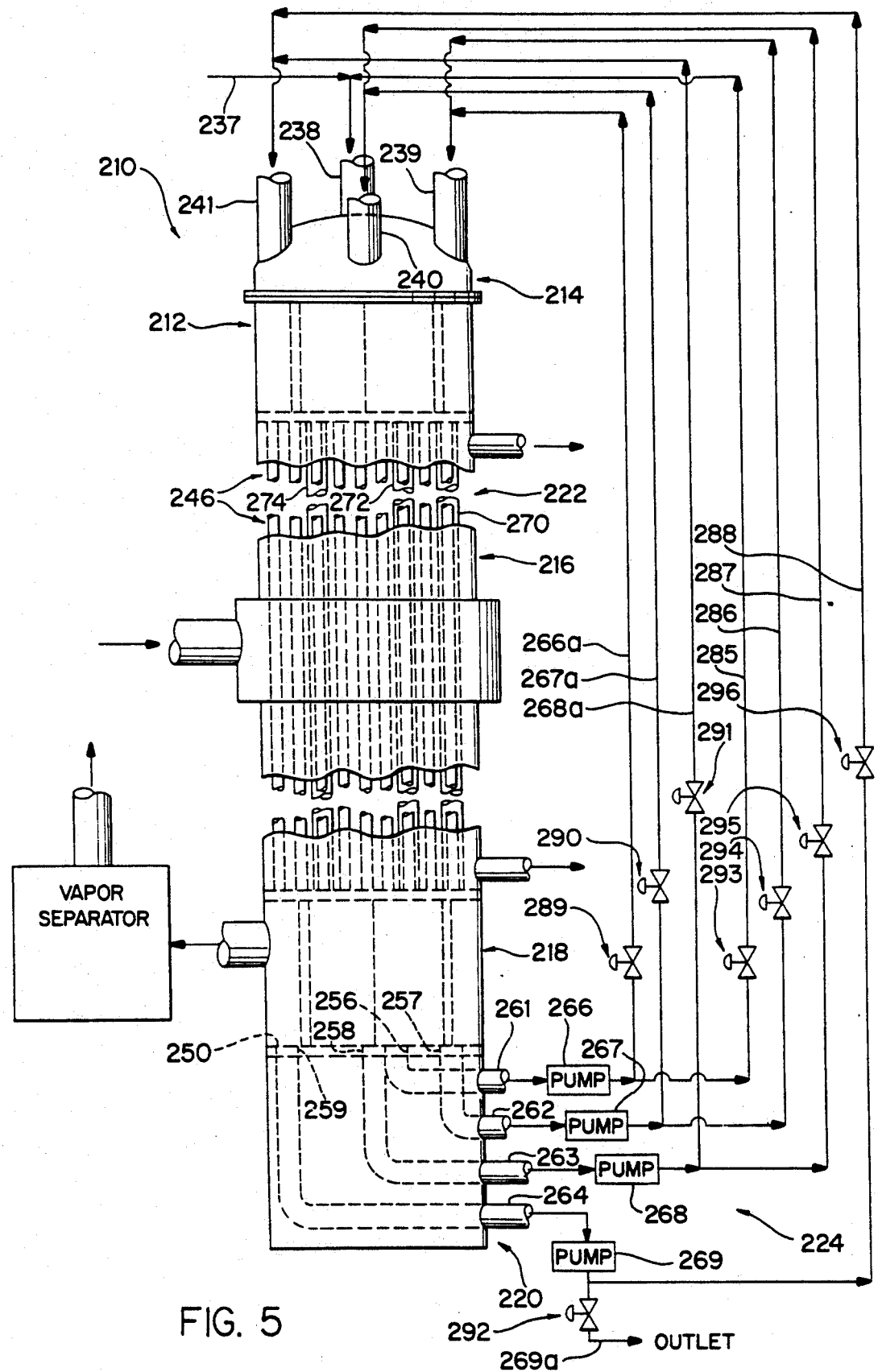
FIG. 5 is a partial side elevational view of an evaporation assembly in accordance with a third embodiment of the present invention.

Third Embodiment of FIG. 5

As seen in FIG. 5, a third embodiment of an evaporation assembly 210 is illustrated in accordance with the present invention. Evaporation assembly 210 is substantially identical to evaporation assembly 10, except that liquid circulating system 24 has been replaced with modified liquid circulating system 224. Accordingly, evaporation assembly 210 will not be discussed or illustrated in detail.

Referring to FIG. 5, an evaporation assembly 210 includes an outer housing 212 with an inlet or head portion 214 at its upper end for receiving inlet liquid to be concentrated, a heat exchange portion 216 below inlet portion 214 for concentrating the liquid being conveyed therethrough by evaporation, an outlet or leg portion 218 located below heat exchange portion 216 for receiving the concentrated or partially concentrated liquid along with the vapors, and a base portion 220 located below outlet portion 218 for vertically supporting outer housing 212. Evaporation assembly 210 also includes a vapor circulating system 222 rigidly coupled between inlet portion 214 and outlet portion 218, and a liquid circulating system 224 rigidly coupled to outer housing 212.

Vapor circulating system 222 includes three circulating tubes 270, 272 and 274 for circulating or conveying the vapors from the outlet section of one set of heat exchange tubes 246 to the inlet section of another set of heat exchange tubes 246.

Liquid circulating system 224 has four discharge tubes 261, 262, 263, and 264 rigidly coupled to outlet openings 256-259, respectively, in third plate 250 for removing the concentrated liquid from their respective outlet sections, and for conveying the concentrated fluid to the next section or to the same section or to a collecting tank or the next effect by fluid pumps 266, 267, 268 and 269. In particular, fluid pump 266 conveys a first part of the liquid from the first outlet section through tube 266a to inlet tube 239 of the second inlet section, and a second part of the liquid from the first outlet section through tube 285 to inlet tube 238 of the first inlet section. Fluid pump 267 conveys a first part of the liquid from the second outlet section through tube 267a to inlet tube 240 of the third inlet section and, a second part of the liquid from the second outlet section through tube 286 to inlet tube 239 of the second inlet section. Fluid pump 268 conveys a first part of the liquid from the third outlet section through tube 268a to inlet tube 241 of the fourth inlet section, and a second part of the liquid from the third outlet section through tube 287 to inlet tube 240 of the third inlet section. Fluid pump 269 conveys a first part of the liquid from the fourth outlet section through tube 269a to a collecting tank or the next effect, and a second part of liquid from the fourth outlet section through tube 288 to inlet tube 241 of the fourth inlet section.

The liquid flow through tubes 266a, 267a, 268a and 269a is regulated to the desired flow by valves 289, 290, 291 and 292, respectively, which maintain a constant liquid level inside the outlet portions of evaporation assembly 210. The liquid flow through tubes 285, 286, 287 and 288 is regulated to the desired flow rate by valves 293, 294, 295 and 296, respectively. Valves 289-296 can be either manual or automatic control valves.

In operation, evaporation assembly 210 operates in substantially the same manner as evaporation assembly 10, except that a portion of liquid may be recycled back to the same inlet section via tubes 285-288 and control valves 293-296.

While only three embodiments have been chosen to illustrate the invention, it will be understood by those skilled in the art that various changes and modifications can be made therein without departing from the scope of the invention as defined in the amended claims.

What is claimed is:

1. A method for concentrating liquid, comprising the steps of:
   conveying a liquid through an evaporation area from an inlet end to a outlet end;
   heating the liquid conveyed through the evaporation area to generate vapors and to concentrate the liquid;
   circulating vapors generated by heating the liquid in the evaporation area from the outlet end of the evaporation area to the inlet end of the evaporation area for mixing the liquid in the inlet end to increase velocity of liquid conveyed through the evaporation area; and
   collecting concentrated liquid at the outlet end.

2. A method according to claim 1, wherein the step of heating includes the step of
   conveying a thermal fluid adjacent to the evaporation area to indirectly heat the liquid to be concenrated.

3. A method according to claim 2, wherein the thermal fluid is steam.

4. A method according to claim 1, wherein the evaporation area is split into a plurality of evaporation sections with each evaporation section having an inlet end and an outlet end, and the evaporation sections are fluidly coupled togetherfor sequentially receiving the liquid to be concentrated; and
   wherein the liquid is conveyed sequentially through each section of the evaporation area.

5. A method according to claim 4, wherein the step of circulating vapors includes the step of
   circulation vapors from the outlet ends of each preceding evaporation section to the respective inlet end of the next evaporation section.

6. A method according to claim 5, wherein the step of conveying liquid through the evaporation area includes the step of
   conveying the liquid to be evaporated through a plurality of heat exchange tubes in each of the evaporation sections.

7. A method according to claim 4, wherein the step of heating the liquid includes the step of
   exposing each of the evaporation sections to the same thermal condition.

8. A method according to claim 2, wherein the step of circulating vapors includes the step of
   boosting the velocity of the vapors from the outlet end of the evaporation area with boosting means.

9. A method according to claim 1, wherein the step of circulating vapors includes the step of
   circulating a portion of the concentrated liquid from the outlet end back to the inlet end.

* * * * *